United States Patent [19]

Noble

[11] 4,326,693

[45] Apr. 27, 1982

[54] SHELF MOUNT FOR VITAL PLUG-IN RELAY

[75] Inventor: Peter M. Noble, Valencia, Pa.

[73] Assignee: American Standard Inc., Swissvale, Pa.

[21] Appl. No.: 103,899

[22] Filed: Dec. 17, 1979

[51] Int. Cl.³ .............................................. F16M 5/00
[52] U.S. Cl. .................................. 248/635; 248/638; 335/229
[58] Field of Search ............... 248/623, 635, 636, 638; 335/229; 267/140.4

[56] References Cited

U.S. PATENT DOCUMENTS

| | | | |
|---|---|---|---|
| 1,766,577 | 6/1930 | Willing | 248/656 |
| 1,839,875 | 1/1932 | Gower | 248/644 |
| 2,246,323 | 6/1941 | Schaelchlin | 248/623 |
| 2,393,071 | 1/1946 | Schaelchlin | 248/635 |
| 2,457,058 | 12/1948 | Markowitz | 267/140.3 |
| 2,461,969 | 2/1949 | Dodge | 267/140.4 |
| 2,617,846 | 11/1952 | Field | 339/147 P |
| 2,836,774 | 5/1958 | Ashworth | 335/229 |
| 3,048,267 | 8/1962 | Starzec | 206/328 |
| 3,425,652 | 2/1969 | Leary | 248/638 X |
| 4,248,400 | 2/1981 | Takagi | 248/635 |

Primary Examiner—Louis Rimrodt
Attorney, Agent, or Firm—A. G. Williamson, Jr.

[57] ABSTRACT

A holder molded of suitable elastomeric material cradles a plug-in relay in operating position, with access openings for calibration adjustments, visual inspection of contacts, and plug coupling of connecting leads. The holder is mounted to a mounting plate and/or the shelf by bolts inserted into cylindrical openings in the bottom of the holder and through a web or diaphragm molded as an integral part of the holder. A spacer tube placed over each bolt spaces the holder a selected distance above the mounting plate. Washer disks of the elastomeric material are placed on both sides of the diaphragm and a lock nut secured onto the bolt to fasten the holder in place. The diaphragms, disks, and spacers combine to provide vibration damping and shock isolation for the relay.

4 Claims, 6 Drawing Figures

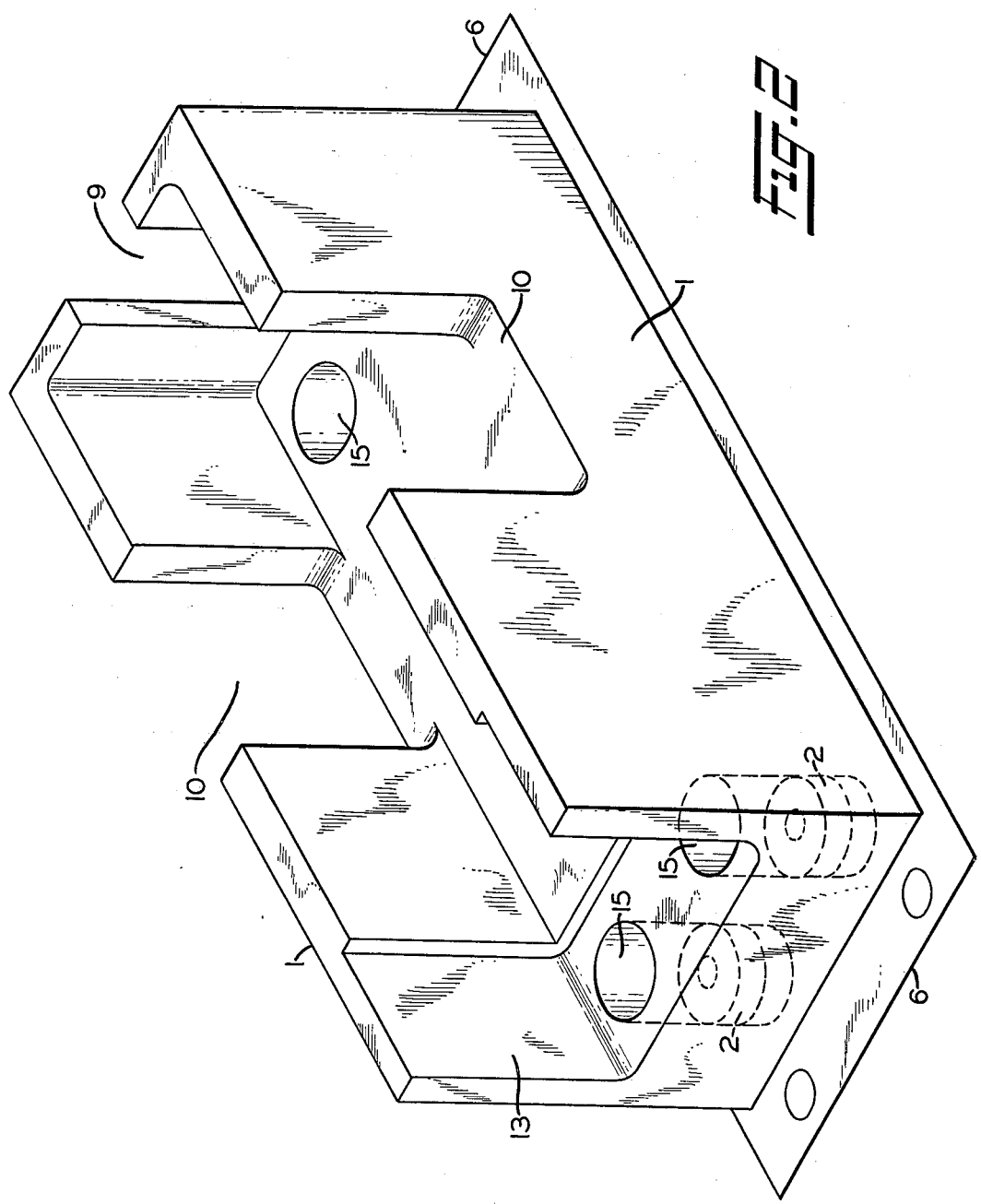

SHELF MOUNT FOR VITAL PLUG-IN RELAY

BACKGROUND OF THE INVENTION

My invention pertains to a shelf mount for a plug-in type relay. More particularly, the invention relates to shelf mounting apparatus, including vibration cushioning and access openings, for vital plug-in type relays normally wall mounted.

Historically, in the railroad signaling field, the vital relays necessary for the operation of signal systems were shock mounted on the shelves within signal equipment houses and cases. Subsequently, wall mounted plug-in style vital relays were developed to allow quick, easy, and error free replacement of relays to permit change out, inspection, repair, and readjustment of vital relays without involving the error-prone process of individually disconnecting and reconnecting all the wire leads to the relay. Since their introduction, the use of plug-in vital relays has increased until they have very nearly supplanted the equivalent shelf mounted relays. To some degree, it is becoming uneconomical to continue manufacturing all possible models of shelf relays. However, applications remain where the shelf mounting of relays is still desirable, e.g., the individual replacement of shelf relays in an existing installation. A mounting arrangement which allows the use of modern plug-in type relays as a shelf relay, with a plug-in connector, provides distinct advantages and is therefore desirable.

Accordingly, an object of my invention is a mounting base with vibration cushioning whereby a plug-in relay may be used in a shelf mounted configuration.

A further object of my invention is a shelf mounting arrangement for a plug-in relay which provides access for relay adjustment and visual inspection of contacts and operation.

Yet another object of the invention is mounting apparatus by which plug-in relays may be shelf mounted, with vibration and shock damping and openings for access to calibration adjustments and for visual inspection of relay contacts and operation.

A still further object of my invention is shelf mounting apparatus for a plug-in type relay including a molded holder element, to cradle the relay in normal operating position, mounted on a shelf with vibration damping and shock isolation to protect the relay from damage and inhibit false operation and with access openings for calibration adjustment, visual inspection, and plug coupler connections of leads.

Other objects, features, and advantages of the invention will become apparent from the following specification and appended claims when taken with the accompanying drawings.

SUMMARY OF THE INVENTION

According to the invention, a molded holder, made of a suitable elastomeric, moldable material, is shaped to hold and/or cradle the plug-in type vital relay for which it serves as a shelf mounting base. This holder is fitted for mounting on a shelf in an instrument house, either direct to the shelf or by an integral mounting plate. At each mounting point, a web or diaphragm is molded into a vertical cylindrical opening in the bottom of the holder through which is inserted a mounting bolt or stud from the shelf or mounting plate. A separate tubular sleeve is placed over the stud or bolt to space the holder above the shelf or plate. The relay holder is then secured to the bolt and against the tube by a locking nut, with washers or disks on both sides of the web element. The web, disks, and tubular elements form a vibration and shock damping arrangement for the relay cradled in the holder. Additional damping may be provided by modifying the lower disk to add a tubular portion to replace part of the spacing sleeve and by forming a larger disk at the lower end of the added tube to provide frictional hysteresis along the surface of the cylindrical opening in the holder. Other openings are formed in the sides of the holder to provide access to calibration adjustments on the relay and/or to allow visual inspection of the relay contacts and operation. Circuit connections to the relay winding and contacts are made through conventional plug couplers.

BRIEF DESCRIPTION OF THE DRAWINGS

Before defining the invention in the claims, I will describe in more specific detail the embodiment illustrated in the accompanying drawings, in which:

FIG. 2 is a perspective view, with partial schematic showing of certain elements, of the shelf mounting holder of FIG. 1, not necessarily to the same relative scale, and viewed from the end shown in FIG. 1B.

In each of the drawing figures, similar reference characters designate the same or similar parts of the apparatus.

DESCRIPTION OF THE ILLUSTRATED EMBODIMENT

Figure 1B:
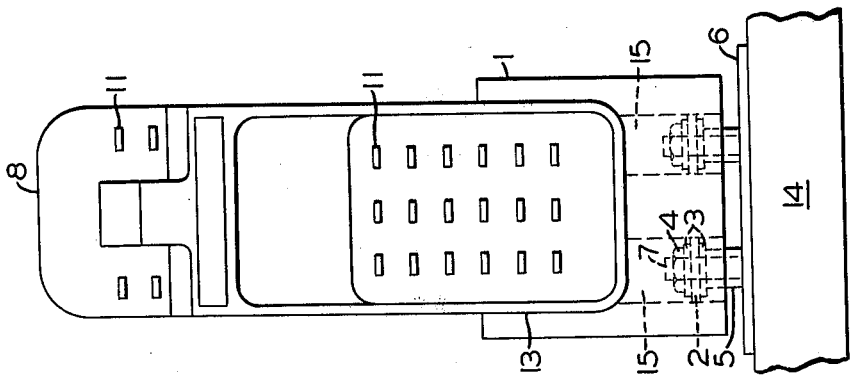
FIGS. 1A, 1B, and 1C are a side and two end views, respectively, of shelf mounting apparatus, designed for one specific and conventional style of plug-in relay, which embodies the concepts of the invention.
Figure 1A:
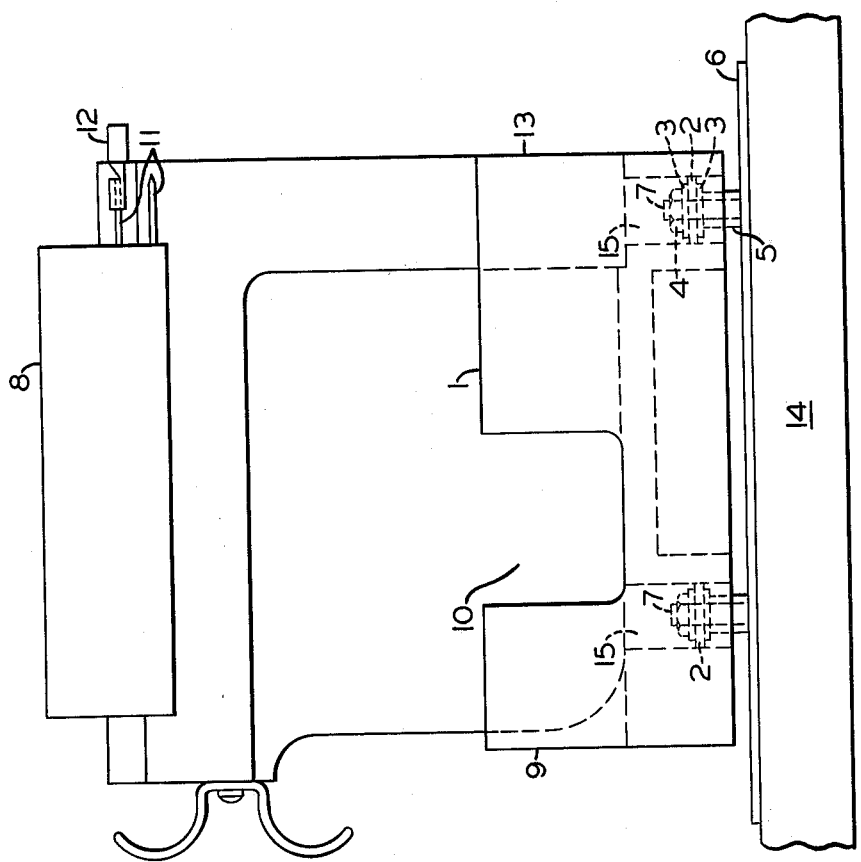
Figure 1C:
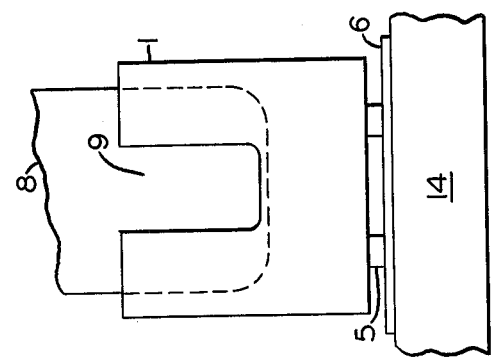

Referring to the drawings, particularly the three views of FIG. 1 and FIG. 2, a molded relay holder 1 is shown which is made of any suitable elastomeric, moldable material such as urethane or rubber. This holder is shaped by design to appropriately hold and/or cradle, in normal operating position, a plug-in type vital relay as outlined by form 8. In the specific illustration, by way of example, the holder 1 as shown is designed to hold plug-in relays of the style disclosed in U.S. Pat. Nos. 2,830,139 (Wells) and 2,836,774 (Ashworth). Obviously, the shape of the holder or mounting may be modified by design to properly hold or cradle other styles of vital plug-in relays. Four cylindrical openings 15 are molded into the bottom of holder 1 for shelf mounting purposes. A diaphragm or web 2 is positioned in each opening 15, molded in place as an integral part of holder 1. The location of the cylindrical openings 15 and diaphragms 2 is determined by the general or average location of the center of gravity of the relay 8 and holder 1 system taken as a whole.

Figure 3:
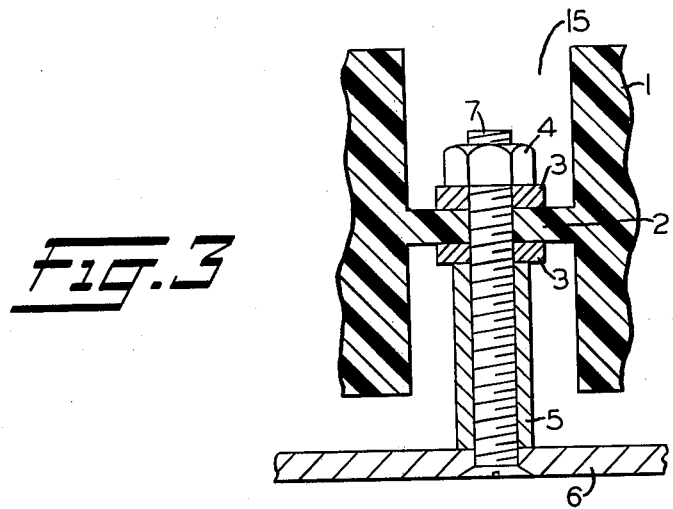
FIG. 3 is an enlarged schematic, cross section view of one of the vibration damping arrangements of the shelf mounting holder of FIG. 1.

Mounting bolts or studs 7 are inserted in (FIGS. 3 and 4) or pressed into or welded to (FIG. 1), respectively, a mounting plate 6 at locations selected so that the bolts/studs 7 may be inserted into openings 15 through corresponding webs or diaphragms 2. Mounting plate 6 is then secured to the shelf 14 (FIG. 1) in any known manner. Alternately, bolts 7 may be mounted directly in shelf 14 to eliminate plate 6. Disks 3 are positioned above and below each web 2 around bolt 7 to serve as washers. A tubular sleeve 5 is placed over each bolt 7 to bear against the lower disk 3. The length of tubes 5 is selected to space holder 1 above mounting plate 6 to allow the vertical motion necessary for shock isolation and vibration damping. Holder 1 is secured to bolts 7, with disks 3, web 2, and sleeve 5 each seated firmly against the adjacent elements, by lock nuts 4.

Figure 4:
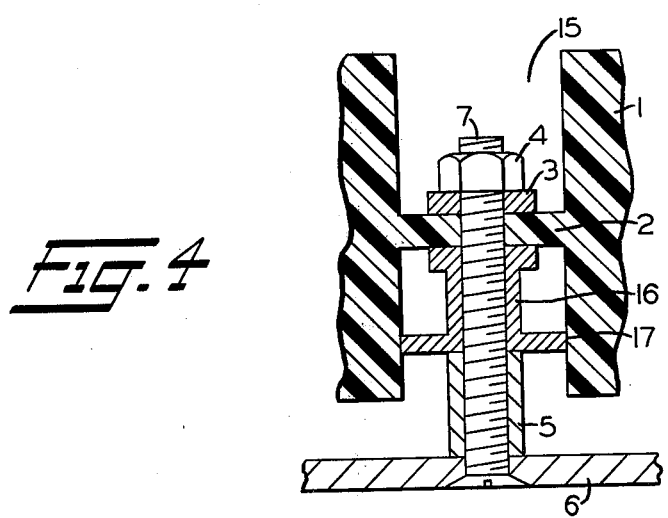
FIG. 4 is an enlarged schematic view, also in cross section, of a modified form of the vibration damping arrangement which may also be used in the mounting holder of FIG. 1.

The resiliency or spring rate of each mounting point, to produce shock and vibration damping, is a function of the material thickness and diameter of web 2 and the diameter of disks 3. Additional damping and hysteresis can be provided by replacing the lower disk 3 at each monting location by a specially formed web disk 16 as shown in the modification of FIG. 4. Disk 16 consists of a disk element similar to original disk 3 which bears against web 2, a tubular extension portion and a lower disk element of larger diameter. Tubular spacer 5 is then of shorter length than in FIG. 3. This special disk 16 will provide the same spring rate as the standard disk 3 but adds a friction interface, against the surface of opening 15 at 17, to produce frictional hysteresis and/or damping as required.

Holder 1 is provided with a front opening or window 9 to allow access to certain adjustments which are features of some types of vital relays, e.g., timing calibration for time element relays. Holder 1 is also provided with side openings or windows 10 which allow the operation and condition of the relay contacts to be observed and inspected. A rear opening 13 in the holder is provided for access to the flat terminals 11 of relay 8 to which all external wire connections may be made by special individual slip-on terminals such as at 12. However, preferably, the connections are prewired to a modified plug coupler, similar to that in FIGS. 1a and 2 of the cited U.S. Pat. No. 2,830,139, which engages all relay terminals. This allows a quick, easy, and error-proof substitution of a replacement relay.

The relay mounting described in the foregoing description thus provides for shelf mounting plug-in type relays where such action is desirable. The relay is held and/or cradled in the required upright position with necessary vibration damping and shock isolation to inhibit improper operations. The holder including damping webs is molded as a single piece from suitable elastomeric material. The use of simple washer disks and tubular spacers at each mounting isolates the holder from the mounting plate and/or shelf. The resulting mounting arrangement is therefore an effective, efficient, and economical device permitting use of easily replaceable plug-in relays in place of the older design conventional shelf relays.

Although I have herein shown and described only a single specific shelf mount for plug-in relays embodying the concepts of the invention, it is to be understood that modifications and changes within the scope of the appended claims may be made without departing from the spirit and scope of my invention.

Having now described the invention, what I claim as new and desire to secure by Letters Patent, is:

1. Apparatus for mounting a plug-in type relay on a shelf, comprising,
   (a) a molded elastomeric holder formed to hold a plug-in relay in the required operating position,
   (b) a plurality of mounting diaphragms molded into said holder at preselected locations,
   (c) mounting means for said holder positioned on said shelf at matching locations for inserting through said diaphragms,
   (d) a disk positioned above and below each diaphragm,
   (e) a spacer positioned on said mounting means below each lower disk and having a length selected to space said holder a preselected distance above said shelf, and
   (f) locking means securable to said mounting means for locking said holder and diaphragms against each associated pair of disks and spacer whereby vibration of a relay mounted in said holder due to shelf movements is substantially dampened by said diaphragms and disks.

2. Shelf mounting apparatus as defined in claim 1 in which,
   (a) said holder includes in its bottom portion cylindrical openings in each of which one of said plurality of diaphragms is molded,
   (b) said mounting means is a plurality of mounting bolts, one associated with each holder opening to be inserted through the corresponding diaphragm,
   (c) each spacer is of tubular structure, with one fitted over each bolt, and
   (d) said locking means is a plurality of locking nuts, one threaded onto each mounting bolt for securing the corresponding diaphragm and disks against the associated spacer to form a vibration dampening arrangement for said holder.

3. Shelf mounting apparatus as defined in claim 2 which further includes,
   (a) a mounting plate to which said mounting bolts are secured and on which said spacers rest,
   (b) said plate fitted for mounting on said shelf on which the associated relay is to be positioned.

4. Shelf mounting apparatus as defined in claim 2 or 3 in which,
   (a) the lower disk element positioned on each mounting bolt includes a second circular disk spaced by a tube portion from the disk adjacent the corresponding diaphragm and having a diameter selected so that the outer rim bears on the inner wall of the corresponding cylindrical opening to produce a frictional hysteresis loss factor to aid the vibration dampening of said holder,
   (b) said tubular spacer bearing against the lower face of said second disk and having a reduced length such that the combined length of said spacer, the length of said tube portion, and thickness of said second disk spaces said holder said preselected distance above said shelf.

* * * * *